United States Patent
Lomet

(10) Patent No.: US 7,747,589 B2
(45) Date of Patent: Jun. 29, 2010

(54) TRANSACTION TIME INDEXING WITH VERSION COMPRESSION

(75) Inventor: David B. Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 11/685,099

(22) Filed: Mar. 12, 2007

(65) Prior Publication Data

US 2008/0228795 A1 Sep. 18, 2008

(51) Int. Cl.
*G06F 7/00* (2006.01)
*G06F 17/00* (2006.01)
*G06F 17/30* (2006.01)

(52) U.S. Cl. .................. 707/696; 707/624; 707/638; 707/746; 707/999.203

(58) Field of Classification Search ............. 707/203
See application file for complete search history.

(56) References Cited

U.S. PATENT DOCUMENTS

| | | | |
|---|---|---|---|
| 5,280,612 A | 1/1994 | Lorie et al. | |
| 5,287,496 A | 2/1994 | Chen et al. | |
| 5,440,730 A * | 8/1995 | Elmasri et al. | 707/203 |
| 5,623,661 A | 4/1997 | Hon | |
| 5,717,921 A | 2/1998 | Lomet et al. | |
| 5,764,877 A | 6/1998 | Lomet et al. | |
| 5,850,565 A | 12/1998 | Wightman | |
| 5,893,117 A | 4/1999 | Wang et al. | |
| 6,766,334 B1 * | 7/2004 | Kaler et al. | 707/203 |
| 7,054,872 B1 | 5/2006 | Das et al. | |
| 7,072,904 B2 * | 7/2006 | Najork et al. | 707/103 R |
| 7,257,689 B1 * | 8/2007 | Baird | 711/162 |
| 7,257,690 B1 * | 8/2007 | Baird | 711/162 |
| 7,293,028 B2 * | 11/2007 | Cha et al. | 707/100 |
| 7,392,234 B2 * | 6/2008 | Shaath et al. | 707/1 |
| 2002/0087500 A1 * | 7/2002 | Berkowitz et al. | 707/1 |
| 2004/0167939 A1 * | 8/2004 | Margolus et al. | 707/203 |
| 2005/0033720 A1 | 2/2005 | Verma et al. | |
| 2007/0118547 A1 * | 5/2007 | Gupta et al. | 707/101 |

OTHER PUBLICATIONS

Lomet. "A review of Recent Work on Multi-Attribute Access Methods" (1992) SIGMOD Record vol. 21, No. 3, 8 pages.

Norvag. "Supporting Temporal Text-Containment Queries" Department of Computers and Information Science, 21 pages.

Lomet, et al. "Media Recovery with Time-Split B-trees" (1991) Cambridge Research Laboratory Technical Report Series, 46 pages.

Lomet, et al. "Transaction Time Support Inside a Database Engine" (2006) Proceedings of the 22nd International Conference on Data Engine, 12 pages.

(Continued)

*Primary Examiner*—Mohammad Ali
*Assistant Examiner*—Griselle Corbo
(74) *Attorney, Agent, or Firm*—Lee & Hayes, PLLC

(57) ABSTRACT

A system and method that facilitates and effectuates transaction time indexing with version compression. The system includes an indexing component that partitions a database page containing multiple temporally related versions of a record into a historical page and a current page based at least in part on a time or a key. The system includes a compression component that constructs backward deltas for compressing earlier (historical) versions of records that are stored on the page. Because there is always an uncompressed version for each record on each page, decompression can be done based solely on information stored on the record's page.

19 Claims, 10 Drawing Sheets

OTHER PUBLICATIONS

Bernstein, et al. "Concurrency Control and Recovery in Database Systems" Addison-Wesley, 1987.

Becker, et al. "An Asymptotically Optimal Multiversion B-Trees" (1996) VLDB J. 6(4), pp. 264-275.

Easton. "Key-Sequence Data Sets on Inedible Storage" (1986) IBM J. R&D 30(3), pp. 230-241.

Hobbs, et al. "Rdb: A Comprehensive Guide" Digital Press, 1996.

Jensen, et al. "Transaction Timestamping in (Temporal) Databases" (2001) VLDB, pp. 441-450.

Jensen, et al. "Temporal Data Management" (1999) IEEE TKDE 11(1), pp. 36-44.

Lomet, et al. "Immortal DB: Transaction Time Support for Sql Server" (2005) SIGMOD, pp. 939-941.

Lomet, et al. "Transaction Time Support Inside a Database Engine" (2006) ICDE, 12 pages.

Lomet, et al. "Access Methods for Multiversion Data" (1989) SIGMOD, pp. 315-363.

Lomet, et al. "The Performance of a Multiversion Access Method" (1990) SIGMOD, pp. 353-363.

Lomet, et al. "Exploiting A History Database for Backup" (1993) VLDB, pp. 380-390.

Lomet, et al. "Using the Lock Manager to Choose Timestamps" (2005) Ideas, PP. 357-368.

Lomet, et al. "Recovery from 'Bad' User Transactions" (2006) SIGMOD, pp. 337-346.

Oracle. Oracle Feedback Technology http://www.oracle.com/technology/deploy/availability/htdocs/Flashback_Overview.htm last viewed Mar. 13, 2007, 7 pages.

Stonebraker. "The Design of the POSTGRES Storage System" (1987) VLDB, pp. 289-300.

Tansel, et al. "Temporal Databases: Theory, Design, and Implementation" Benjamin/Cummings, 1993.

* cited by examiner

TRANSACTION TIME INDEXING WITH VERSION COMPRESSION

BACKGROUND

There has been an increasing need for computer systems to provide access to historical information, not just the latest state of the data. One example involves users interacting with an online web application. Typically, an on-line session can include individuals interfacing with client applications (e.g., web services) to interact with the database server that stores information in a database accessible to client applications. For instance, a stock market web site can provide users with tools to retrieve stock quotes (e.g., current and historical) and purchase stock. Users can enter stock symbols and request stock quotes by performing mouse clicks to activate a query. Client applications can then query databases containing stock information and return appropriate stock quotes. Users, based on returned stock quote information, can thereafter purchase or sell stocks by supplying suitable information, wherein submitting buy or sell orders initiate database queries to return current pricing information and order status.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter relates to a transaction time database system that can be included in a database engine that enables high performance for temporal applications. The claimed subject matter provides an integrated access method for indexing both current and historical data based on a Time Split B-tree. Unlike the current limited commercial version support, with Time Split B-trees, access to all historical versions arbitrary far back in time is logarithmic in the number of versions. To improve performance further, versions are locally compressed using a delta compression that exploits the commonality between adjacent versions of the same record. This technique is also applied to index terms on index pages. The Time Split B-tree implementation as utilized by the subject claimed matter can be based on the native B-tree access method typically provided by the base database engine, and, importantly, when this is done, current versions can be accessed by the original B-tree implementation.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
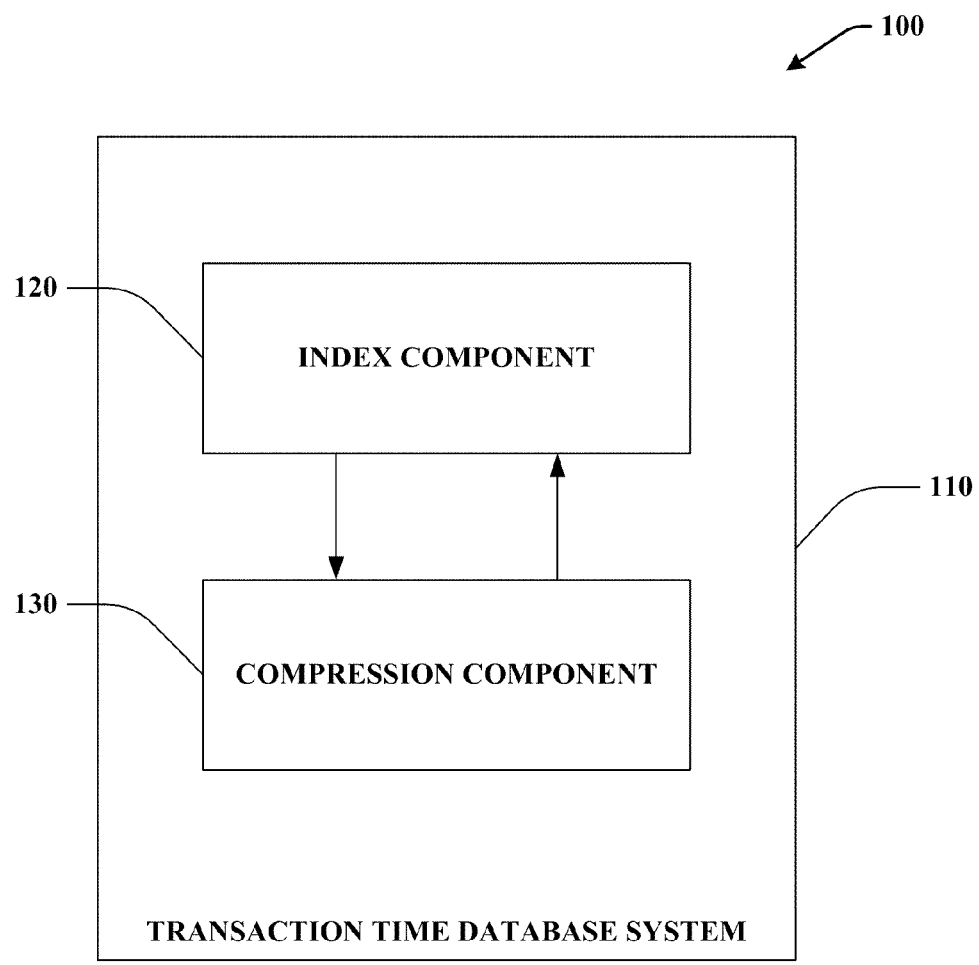
FIG. 1 provides a detailed block diagram of a transaction time database system in accordance with one aspect of the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

The claimed subject matter relates to a transaction time database system that provides access to both current and historical information, that uses versions to support both "as-of" queries requesting information at an arbitrary time in the past and snapshot isolation, which requires access to recent versions. The subject matter as claimed is based at least in part on the understanding that the lack of high performance access to historical versions has seriously impeded the adoption of temporal functionality. Layering temporal support on top of a database system is cumbersome and typically is not practical. Accordingly, the claimed subject matter makes changes directly to the database server storage engine component. Regular insert/update/delete actions never remove information from the database. Rather, these actions add new data versions, thus maintaining a complete, query-able history of states of the database.

The claimed subject matter utilizes a Time Split B-tree as an integrated index for accessing both current and historical versions of data. This enables the claimed subject matter to provide access to any version that is logarithmic in the number of versions. Further, range query performance, after the initial logarithmic probe, is linear in the size of the answer. The Time Split B-tree as utilized by the subject claimed invention, for example, can be derived from the B-tree implementation already present in the database server. Accordingly, the claimed subject matter exploits the basic B-tree implementation associated with the database server for its concurrency control and recovery framework, to provide a Time Split B-tree that both key splits, like a B-tree, and time splits.

Time splits are required to provide the ability to index both by key and by time. To ensure that the density of records within a range has a good guaranteed minimum for all "as-of" queries, the claimed subject matter typically performs a time split prior to a key split. This minimum version density guarantees that the cost of any "as-of" range queries are linear in the number of records within the range.

Performance is further enhanced as historical versions, both of data records and of index terms, are compressed. This compression is a form of delta compression that is derived from the undo log record structure used in typical database servers (e.g., SQL Server). All data is compressed only locally within a page so that it may be uncompressed by accessing information only within the same page upon which it resides.

Transaction time database systems in one aspect support databases that can contain multiple versions of data. Thus, when a transaction inserts new data records into the database, the claimed subject matter can create a version of the record with a timestamp $T_i$ that indicates the beginning of the version lifetime. Subsequent updates create further updated versions of the data that can accordingly be inserted into the database and marked with an appropriate timestamp $T_j$ such that, for example, $T_j > T_i$, indicates its start time. The prior version with start time $T_i$ implicitly has an end time of $T_j$, the start time of its successor version. A delete produces a special new version called a "delete stub", that indicates when the record was deleted, and hence provides a successor version that provides an end time for the last version of the record. Record versions can be perceived as being immutable (e.g., are never updated in place). A record version can be linked to its immediate predecessor version via a version chain, such that versions of the same record that are adjacent in time reside on the same page, for example.

Transaction time database systems can provide transaction time functionality via a collection of modest changes to an underlying database engine. These modifications can include, for example, utilization of an attribute (e.g., "Immortal") in the table create statement to specify a transaction table; adding an "As-Of" clause to transactions statements to specify queries of historical data; and assigning version timestamps consistent with a serialization order at transaction commit, the timestamps being posted to the versions of records after commit. Further, other illustrative modifications to the database engine can also include appending versioning information to each tuple in the database; the versioning information can include, for example, timestamps, sequence numbers, and version chain pointers. Additionally, since database pages are typically organized as slotted arrays, with the most recent record version pointed to directly by an array entry, the database engine can be modified to ensure that older versions of records are chained together within a page in order of their create time, wherein the create time of subsequent versions serves as the end time of earlier versions. Furthermore, new log operations can be defined to enable recovery redo and undo of the "versioned" updates required for transaction time support. Moreover, the database engine can also be modified so that growing the number of unique records can be accommodated via key splitting and new pages can be acquired via time based page splitting in order to permit space for versions associated with a given record or records to grow.

FIG. 1 provides a detailed depiction 100 of transaction time database system 110. As illustrated, transaction time database system 110 can include index component 120 and compression component 130. Index component 120 effectuates the integrated indexing of historical and current records, by both key and by time. In order to effectuate the integration, index component 120 can employ a Time Split B-tree utilizing, for example, a Write Once B-tree splitting strategy. It has been found that the Write Once B-tree splitting strategy typically guarantees that storage utilization for any version on a page is generally always greater than a minimum value equal to half the storage threshold used to determine when to key split a page. This strategy involves performing a time split immediately prior to doing a key split (e.g. without intervening updates). It should be noted that the version compression described herein utilizing Time Split B-tree indexing is but one illustrative manner of effectuating the integrated indexing of historical and current records, however the claimed subject matter is not so limited. Nevertheless, using time splits (whether the resulting pages are indexed or not) does not require extra compression/decompression of versions during the splitting process. Both pages end up with a single uncompressed version (the latest version) and subsequent updates to the current page can continue without regard to the splitting (e.g., no special work needs to be done).

Additionally, transaction time database system 110 can include compression component 130 that facilitates compressing versions in order to reduce storage costs and improve query performance. Temporal functionality has become of increasing interest to database customers for auditing, legal compliance, trend analysis, etc. Meanwhile, disk costs have been dropping rapidly and significantly. Thus, cost/benefit ratios have gotten dramatically better (larger). Nonetheless, disks can be a major cost, not only for the hardware, but also for the human labor cost of managing it. Further, range query performance depends upon the density of records (e.g., records per page accessed) for the version of interest. This record density is reduced compared to non-versioned databases due to the existence of multiple historical versions in the same page. This is especially important when the historical versions share a page with the current versions, as accessing current time data is typically more frequent than accessing any given historical time data. Accordingly, compressing versions is important for both reducing storage costs and for improving query performance.

Figure 2:
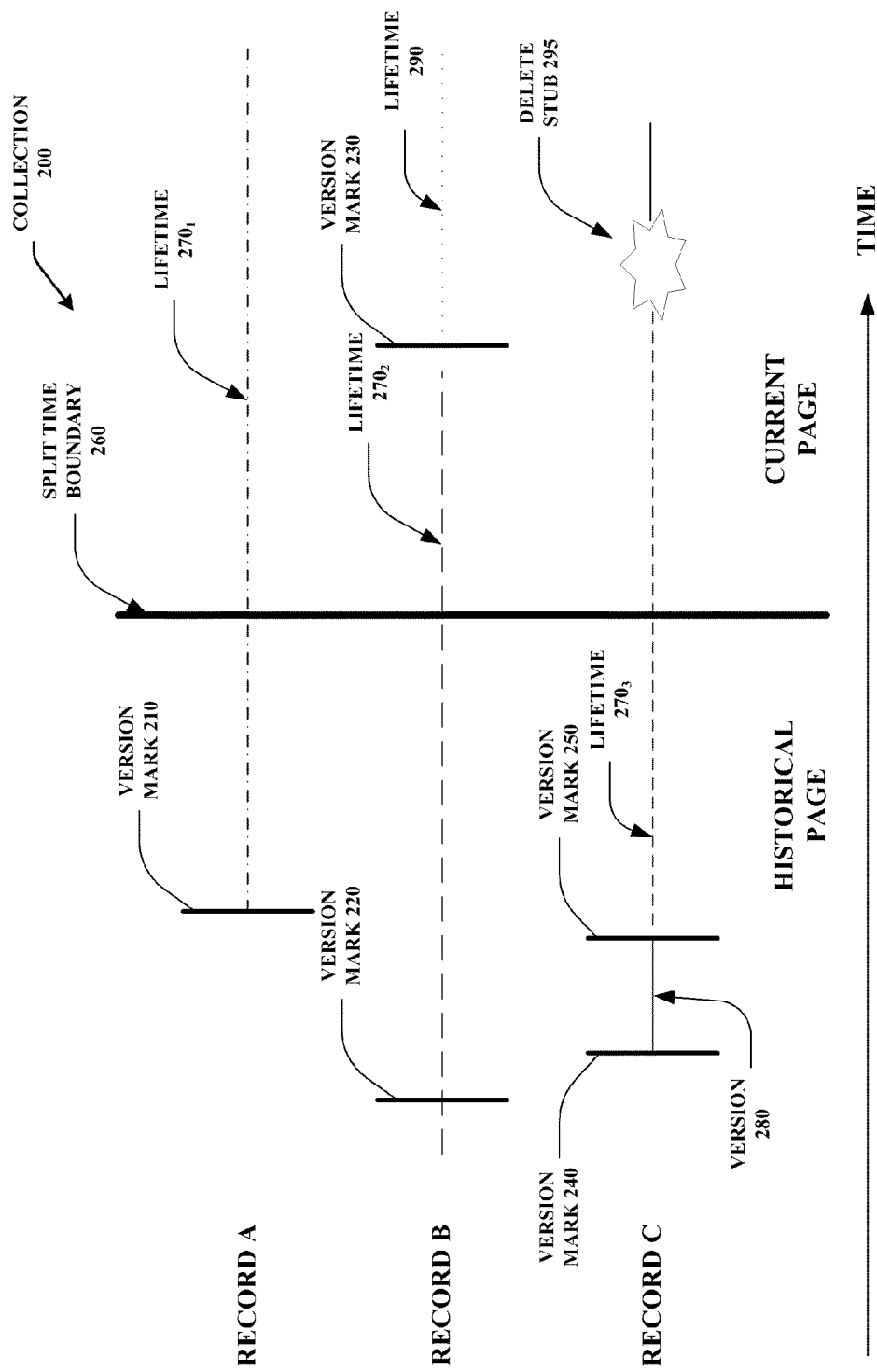
FIG. 2 illustrates a collection of versions of records as employed by in aspect of the claimed subject matter.

A time split is a special form of split and can be illustrated as depicted in FIG. 2 as a collection 200 of versions of records (e.g. Record A, Record B, and Record C) wherein Record A, as illustrated, has recently been initiated and only has a single version as represented by version mark 210. Record B in contrast is an existing record that, as depicted, has had multiple of prior versions as represented by version marks 220 and 230 respectively. Similarly, Record C too has multiple versions associated therewith and represented by version marks 240 and 250 respectively. As illustrated, and as occurs in reality, it is almost never the case that a choice of a split time boundary 260 will avoid crossing the interval representing the lifetime (e.g., $270_1$-$270_3$) of some version; no matter where the split time boundary 260 is imposed there typically will be at least one extant ongoing version. Accordingly, when index component 120 utilizes the Write Once B-tree splitting strategy, the split takes place at current time, for example. Accordingly, all records alive at current time (e.g., when a time split is imposed) have their lifetimes (e.g., $270_1$-$270_3$) "split" by the boundary 260. Thus, the Time Split B-tree index partitions key-time space into rectangles where all versions with records in the key range that have lived within the time range defined by the page must be on the page. This can, for example, only be accomplished by having the versions with lifetimes that cross the split time boundary 260 appear in both resulting pages (e.g. the historical page and the current page). As depicted in FIG. 2 this means that the version 280 with its lifetime exists only in the historical page, lifetimes 270₁-270₃ exist on both the historical page and the current page, lifetime 290 exists only in the current page due to the fact that a transaction with respect to Record B occurred subsequent to the imposition of the split time boundary 260, and at 295 a delete stub is created when the record is deleted meaning that this deletion only occurs in the current page but not necessarily in the historical page (e.g., historical delete stubs generally are not propagated across time splits).

Briefly referring to FIG. 1, in a Time Split B-tree, after a time split occurs, an index term describing the new node is posted by index component 120 to the parent index page describing the split. Doing this requires that index component 120 update the TSB-tree index page in a similar manner to how B-tree index pages are updated, using a page format similar to that utilized to format B-tree data pages. Further, index component 120 needs to be prepared to time split index pages as well as key splitting them. These index page splits, though identical in concept, are subtly different in detail from data page splits.

Figure 3:
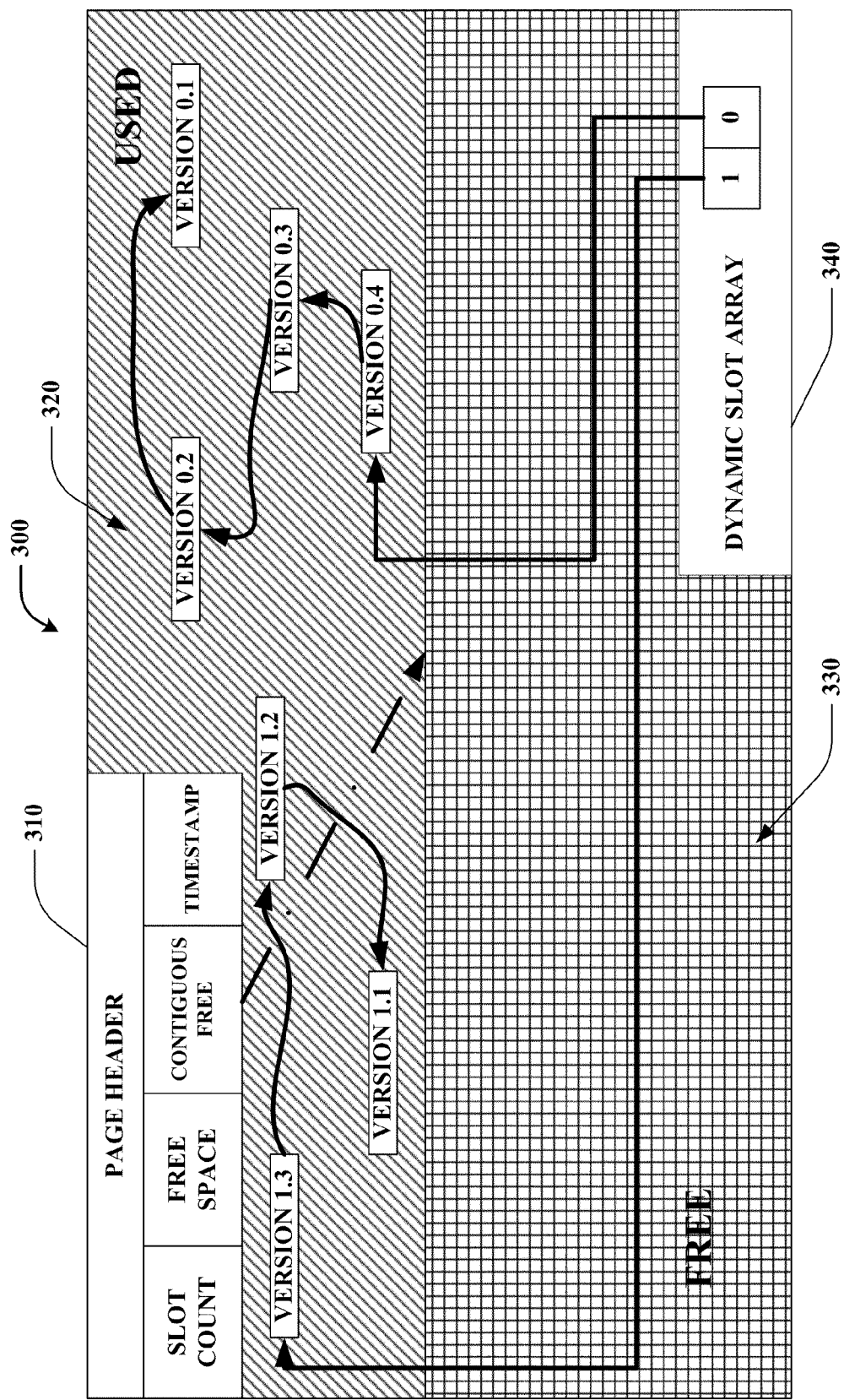
FIG. 3 illustrates a data page layout with uncompressed versioned data in accordance with an aspect of the claimed subject matter.

FIG. 3 illustrates a data page layout 300 with uncompressed versioned data in accordance with an aspect of the claimed subject matter. The data page layout 300 can include page header 310 that can include information such as, for example, slot count, amount of free space, a link to contiguous free space, and timestamp data. Data page layout 300 can also comprise a used portion 320 that can contain multi-version data, and a free portion 330 that can contain contiguous free space. Additionally, data page layout 300 can also include dynamic slot array 340 that provides links to the most current version of data. Dynamic slot array 340 is an array of slots wherein each slot can be, for example, 2 bytes in length.

The claimed subject matter bases its data page layout on the standard slotted page organization that is typical of database management systems. Each entry in the slot array points to a data record that is the latest version of the record on the page. When the page contains current data, the latest record is either the last committed version of the record or is an uncommitted version from a still executing transaction. Accordingly the page can be managed as follows when data manipulation operations occur. An insert produces a record directly referenced by a slot, records with higher keys being moved up one slot to make room for the insert. The newly inserted record's back pointer is thereafter set to null. An update produces a new version for an existing record. This version can be referred to by the record's existing slot entry. The new version's back pointer references the version that had been current prior to the update. A delete can be handled like an update in that a new version is created and linked into the chain of versions at its start. But this new version is special and can be called a "delete stub". The delete stub can be marked as a "ghost", a database (e.g., SQL server) feature that makes the version invisible to ordinary queries. The subject matter as claimed uses the entire pre-delete version as a delete stub to ensure that the ordering keys of the table are present in the stub in the same format as in the original record. Each of the foregoing operations can be logged with a special log record signifying a "versioned" operation. Should a system failure occur, a redo operation can ensure that any missing version is restored, while and undo operation can remove an uncommitted version, and update its slot to reference the earlier version.

An important aspect of this organization is that, for ordinary (current time) queries, the existing database code sees a page that looks like the page that exists for the unversioned case. This means that part of the access method, which already works, will continue to work when versioning is provided.

In order to provide the illustrative data page layout 300 depicted above, index component 120 (FIG. 1) needs to employ a Time Split B-tree to index both key space and time. Because of this, index component 120 splits data pages in two ways, by key like B-trees, and by time via a time split described supra. Each page in the Time Split B-tree can be responsible for a rectangular region in key-time space. Key splits in the Time Split B-tree are operationally similar to key splits in the B-tree. All records with keys greater than the split key are moved to a new page. For time splits, versions whose end times are before the split are moved to the historical page. Versions with begin times later than the split time are put in the current page. Because versions have interval time extents (e.g., a start time and an end time), the time split requires that versions that span the time chosen for the split be represented in both the resulting pages.

Whenever a data page fills up, the page will need to be split. A decision needs to be made as to whether the split is a time split, a key split, or both. Transaction time database system 110 typically avoids performing a key split by itself. Rather, key splits always occur immediately after a time split. This ensures that any version (as seen by an as-of query) has a minimum storage utilization. Accordingly, index component 120 chooses between a time split by itself and a time split followed immediately by a key split; a choice controlled by storage utilization of current versions in the current page that is being split.

If it is assumed that a single version current utilization $SVC_{page}$ for a page is defined as the size of the page's current data (in bytes) divided by the page size for the current page (again in bytes), a threshold value for this utilization to control how the page splits is $SVC_{thres}$, and if $SVC_{page} > SVC_{thesh}$ then index component 120 can perform a key split after the time split. Otherwise, index component 120 only performs a time split. The trade-off between the space required to store versions and the storage utilization seen by an as-of queries can be controlled via the threshold value $SVC_{thres}$. Accordingly, the higher the threshold value the more solo time splits are done, the lower the value, the more often that key splits are done as well as time splits.

Key splits are almost completely conventional, the only extra thing needed is to ensure that not only the current records, but also their historical versions, are both split by key and distributed appropriately to the resultant pages. When a page is time split, it can be split at the current time $T_{curr}$. The entire old page (which is a current page and can remain the current page after the split) is copied (e.g., byte by byte) to the newly created historical page. The existing current page is then updated to remove the record versions that do not live across the split time. Only the last committed version of each record is retained in the current page, along with any uncommitted versions. The historical versions, because their end times are earlier than the split time, are removed from the current page.

Delete stubs can typically be used to denote the termination of a prior version. The claimed subject matter can use the entire deleted record as the delete stub, with a timestamp that is the time of the delete. This is done so that the key, which can be a compound multi-field key, can be examined when looking for historical records on the page. The delete stub is marked as a "ghost" record and ghosts are ignored during queries. The immediately prior record version is the full deleted version, but with the start time as its timestamp, hence correctly representing the version and its lifetime. When a page is time split, the claimed subject matter can remove delete stubs from the current page. The delete stubs have done their job of providing an end time for the deleted record and are not needed for this purpose in the new current page since the prior deleted version is no longer present in the current page.

Compressing versions can impact both the total number of pages required to store versions as well as the utilization that will be seen by an as-of query. This is determined by how $SVC_{thres}$ is selected wherein $SVC_{thres}$ can control the splitting policy. If $SVC_{thres}$ is left unchanged when compression is introduced the number of pages required to store versions can be reduced thus improving multi-version utilization (the size of all versions (uncompressed) divided by the storage size needed to contain them). Alternatively, an attempt can be made to keep the number of pages unchanged by increasing $SVC_{thres}$, which improves $SVC_{curr}$, and the effective utilization seen by all as-of queries. Other threshold changes which produce results intermediate to these extremes can also be accommodated.

The Time Split B-tree clusters records by key and time, storing all versions of a record that exist with their page's time range. All versions of a record share at least the primary key fields in common. These versions frequently share many fields, with an update frequently changing only a small number of fields of a record. Accordingly, compression component 130 can compress record versions using a very simple backward delta compression scheme that exploits the frequently large commonality between a record version and its recent predecessor versions.

Figure 4:
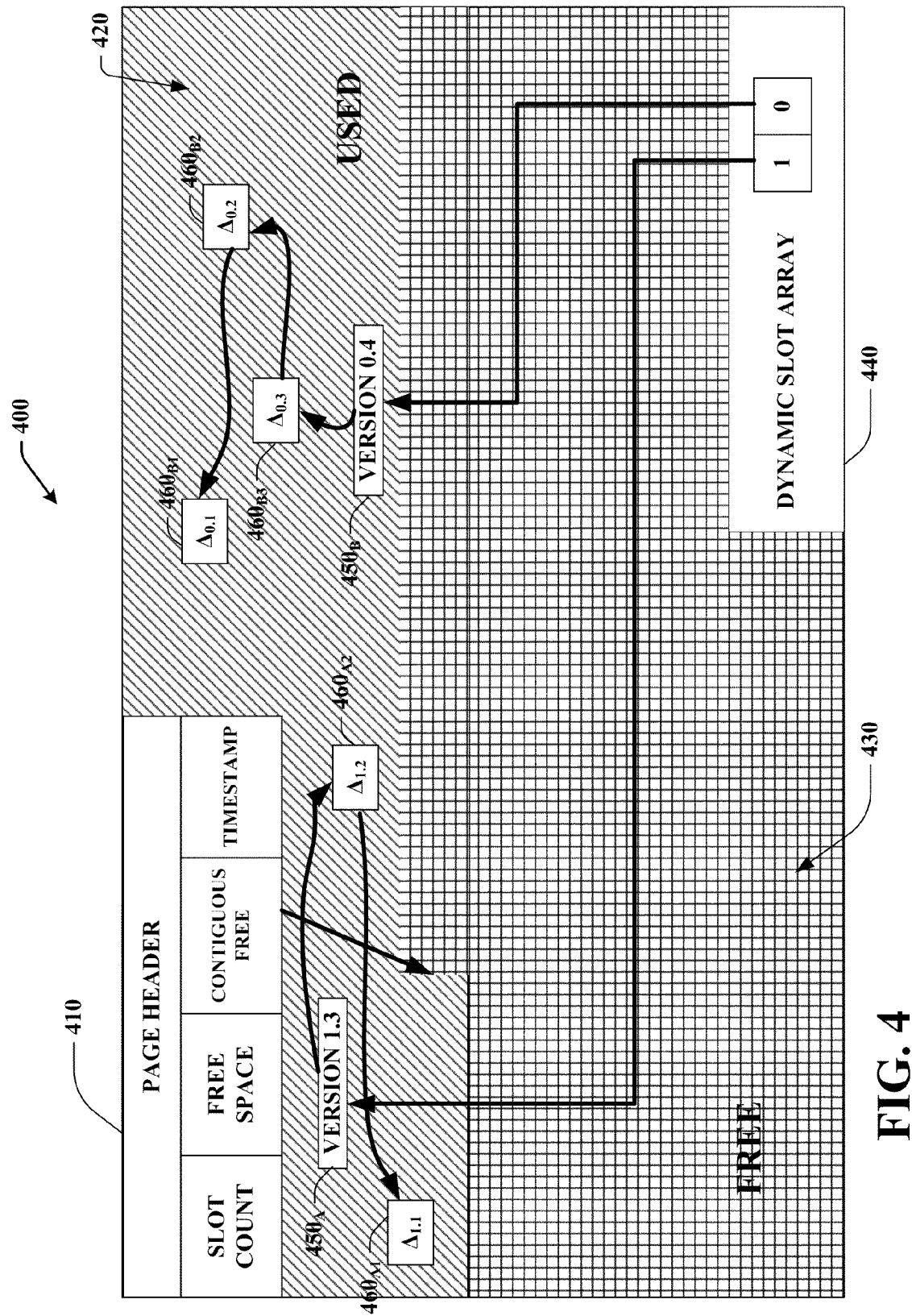
FIG. 4 illustrates how deltas are tied into a record's version chain on a page in accordance with an aspect of the claimed subject matter

FIG. 4 illustrates how deltas are tied into a record's version chain on a page 400 in accordance with an aspect of the claimed subject matter. Page 400 can include page header 410 that can include slot count, free space, links to contiguous free space, and timestamp information, for example. Page 400 can further include a used portion 420 that can include versions of records (e.g. $450_A$ and $450_B$) and deltas (e.g., $460_{A1}$, $460_{A2}$, $460_{B1}$, $460_{B2}$, and $460_{B3}$)—the differences between the current version and previous version of a particular record $450_A$ and $450_B$ respectively. For example, as illustrated $450_A$ is the most current version of the record and deltas $460_{A1}$ and $460_{A2}$ represent two prior versioned differences between the current full version of the record $450_A$ and successive incremental difference $460_{A2}$ and $460_{A1}$ respectively, i.e., $460_{A1}$ is the earliest version, $460_{A2}$ is an intermediary version, and $450_A$ is the latest (current) version of the record. Similarly, $450_B$ represents the most current version of the record and incremental versions $460_{B3}$, $460_{B2}$, and $460_{B1}$ represent successively older incremental versions (or deltas) of record $450_B$. Page 400 can also include a free portion 430 that contains contiguous free space and a dynamic slot array 440 that provides links to the most current version of records, for example, $450_A$ and $450_B$. It should be noted that the latest version of a record (e.g., $450_A$ and $450_B$) on page 400 remain uncompressed. This means that current versions are uncompressed and that current time database functionality is unaltered by compression. All predecessors (e.g., $460_{A1}$, $460_{A2}$, $460_{B1}$, $460_{B2}$, and $460_{B3}$) of this latest version are delta compressed.

In order to facilitate the foregoing, the compression component 130 can modify the compression technique currently employed by database engines (e.g., SQL server) to compress log records. A database engine currently stores in its log record for updates information only about the updated fields of the record. The log record contains the change offset, length of the data before updating, and the length the data after the update. This permits recovery to remove the old value from a record and replace it with the new value, without knowing anything about fields. Rather, it can perform the update entirely by byte replacement based at least in part on information in the log record.

A log record needs to include more than is necessary for deltas however. A log record needs to identify the record and the page on which it resides. However, that information is unnecessary for delta records. Links from earlier uncompressed record versions on the page can provide a record identifier (e.g., key). Further, the size of the length fields describing the delete and insert lengths, optimizing for small updates can be reduced, at the cost of having to break large updates (e.g., greater than 255 bytes) into several changes within the delta record. This log record information can be interpreted for doing both undo and redo recovery. The subject matter as claimed exploits only the undo interpretation, as these are backward deltas, and there is no necessity to perform redo.

When a record is deleted a delete stub can be utilized to provide the end time for the last version of the record. Accordingly, compression component 130 can mark the delete stub with a "ghost" flag to indicate that normal operations should treat such a record as not being present. For example, the delete stub can consist of a complete copy of the prior version with the ghost flag set. This technique means that the slot array points directly to a version (e.g., the delete stub) that contains the key value for the record so that records can be correctly placed on the page (e.g., in key order). The database engine (e.g., SQL Server) does not know where the key is, so the entire record can be left, letting the query processor retrieve the key when needed.

Figure 5:
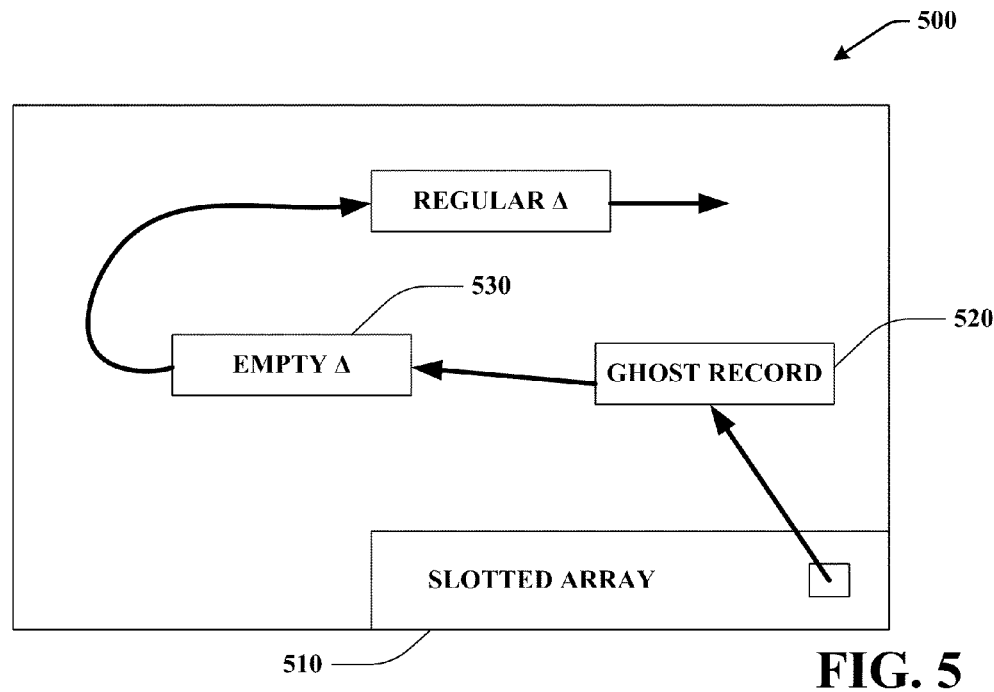
FIG. 5 depicts utilization of an empty delta record to indicate a delete stub in accordance with the disclosed subject matter.

The technique of using the prior record as a delete stub is logically effective but obviously is expensive, since its sole purpose is to provide an end time for the preceding record version. With compression, the claimed subject matter has the chance to reclaim the extra space, though this is done somewhat indirectly. The delete stub is still the entire preceding record (the deleted record), and is thus unchanged from before, continuing to also provide the query processor with the key for the record. However, the preceding record can now itself be replaced by what one can call an empty delta compressed record, since the preceding record is identical to the record version in the delete stub, except for the timestamps and the ghost flag. This is illustrated in FIG. 5 wherein slotted arrays 510 links to ghost record 520 which in turn points to an empty delta record 530. It should be noted that the delta record contains no change since the version represented by the empty delta is unchanged from the delete stub, together with some control information and the timestamp information. So while the delete stub cannot be compressed, because we continue to need its key information, the record for which it is a delete stub is reduced to an empty delta record.

Figure 6:
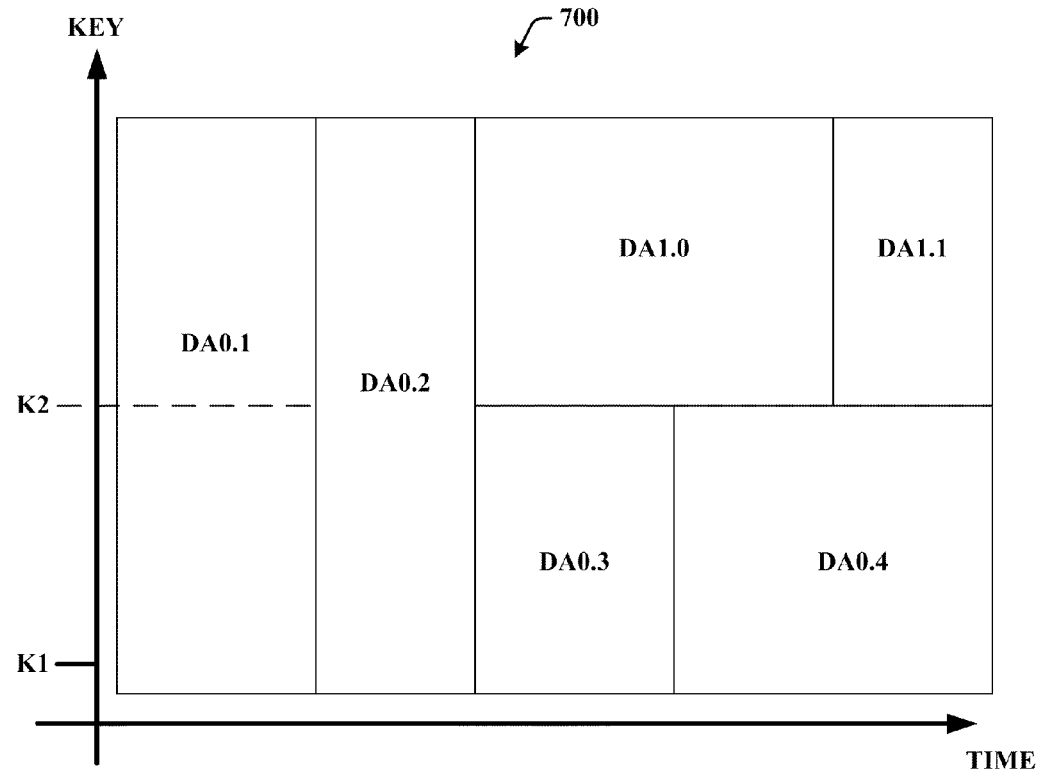
FIG. 6 illustrates the division of key-time space as might arise in a Time Split B-tree in accordance with the subject matter as claimed.

A Time Split B-tree partitions data by key and time into key-time space rectangles. That is, all records with keys in the contiguous key range and with lifetimes that lie within a contiguous time range will have versions in a data page. Each Time Split B-tree index term that references a data page includes a description of this key-time rectangle and a pointer to the data page described by this rectangle. Thus, index terms (and their versions) differ from data record versions. Each record version has a single unique key and a time period in which it lives. FIG. 6 illustrates the division of key-time space as might arise in a Time Split B-tree. It should be noted that adjacent index terms at a later time can share a historical index term at an earlier time.

A second way in which index term "versions" differ from record versions is that index terms are not directly associated with any transaction. Thus, a new index term, together with an appropriate key-time rectangle description typically can be generated during the execution of the transaction but will not share the timestamp of any transaction. Rather, the timestamps are used to partition the time dimension of the Time Split B-tree index, and hence there is some flexibility in how time is chosen.

A further way in which index terms differ from record versions is that index terms referring to current data (e.g. the space that they describe includes the current time) are not immutable but can, in fact, be updated in place. For example, consider an index term pointing to a current data page, when the data page is split the space of the key-time rectangle is divided between two index terms. Further, the index term referencing what is now historical data, must point to a new historical page since historical versions are moved to a new page rather than the still current data. Accordingly, historical data can be moved so that the current data can stay on what is regarded as the "current" medium while the historical data is exported to some kind of archival medium.

Each of the foregoing characteristics of index terms can have an impact on the management of Time Split B-tree index pages with their "versioned" index terms, and how index pages are key split and time split.

Index terms, like record versions have their "historical" versions maintained in the same way that record versions are maintained (e.g. in a linked list starting at the current (or most recent) version). The difference is that the earlier versions are not really earlier versions of the current index term. Rather, they are index terms that reference earlier versions of the data that is referenced by the current index term.

Figure 7:
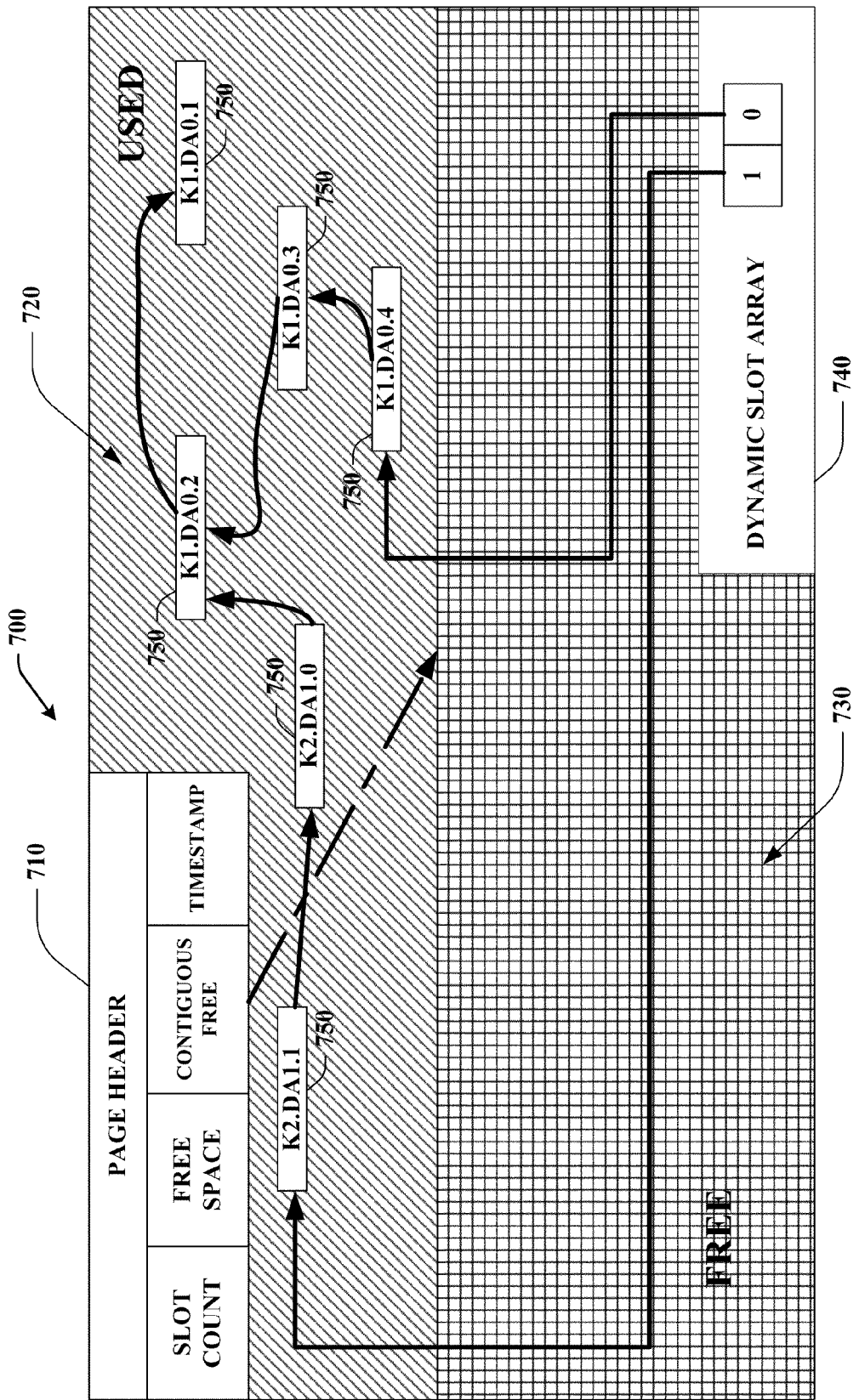
FIG. 7 provides a representation of index terms within an index page in accordance with an aspect of the claimed subject matter.

FIG. 7 provides a representation of index terms within an index page 700 in accordance with an aspect of the claimed subject matter. As depicted index page 700 can represent the index terms used for the space decomposition illustrated in FIG. 6, for example. Index page 700 can include page header 710 that can include slot count, free space, links to contiguous free space, and time stamp information, for example. Index page 700 can also include used portion 720 that can include index terms 750. Further, index page 700 can also include free portion 730 that can contain contiguous free space and a dynamic slot array 740 that provides links to index terms 750. It should be noted that, unlike record versions, two adjacent index terms can share an earlier index term in the chain. This happens whenever a child page (data page or lower level index page) is key split.

Index terms on an index page can be compressed in the same way that one compresses record versions on a data page. Index terms can be compressed very effectively. For example, an index term space description can be the <low key, low time> corner of the key-time region referenced by the index term, and an index term can include a pointer to the child node that the term references. The key of an index term is unchanged in a time split. Hence, the index term pointing to the same key range but in an earlier time period only differs in child page pointer and timestamp.

Even though two later index terms have different low key values, they can both point to a compressed historical index term in which the key value is omitted, suggesting that it can be shared with the index term that precedes it on the chain (e.g., an index term preceding another on the chain indexes a later part of the space). This is not actually the lower key value for one of the terms resulting from a key split. But the historical index term will nonetheless point to the correct child page containing the data for the region specified.

Figure 8:
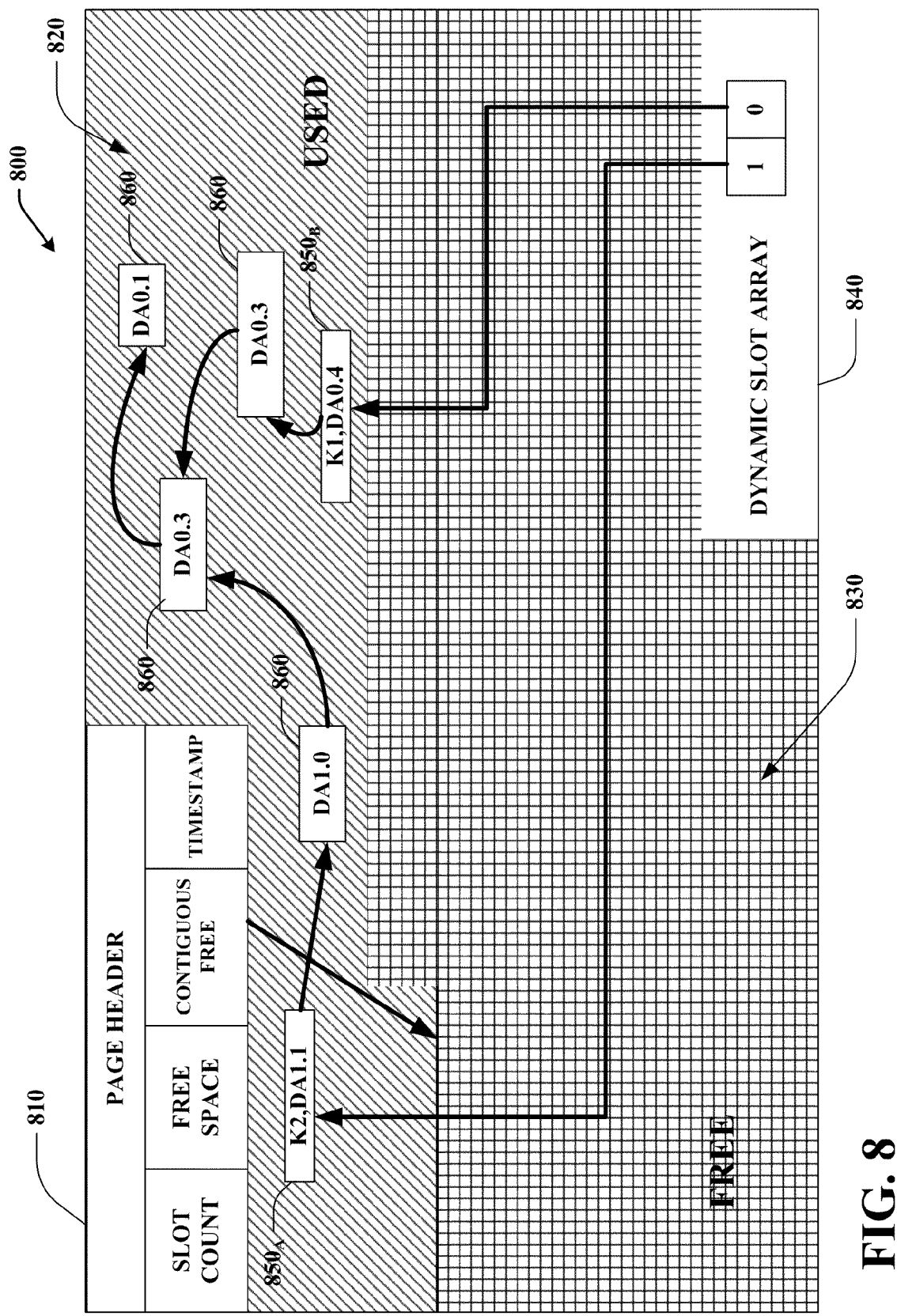
FIG. 8 illustrates an index page with compression turned on in accordance with an aspect of the claimed subject matter.

FIG. 8 illustrates an index page 800 with compression turned on in accordance with an aspect of the claimed subject matter, and more particularly illustrates what happens to index page 700 (FIG. 7) when compression is turned on, for example. Index page 800 can include page header 810 that can include slot count, free space, links to contiguous free space, and timestamp information, and the like. Index page 800 can also include used portion 820 that can contain index terms 850, free portion 830 that can comprise contiguous free space on the page, and dynamic slot array 840 that can provide links to index terms 850. In all index terms referring to only historical data, the key value is omitted. During lookups, the key value from the index term referring to current data that precedes the index term on the version list is used.

Complications arise when splitting an index page that do not arise when splitting a data page. And these are directly related to the characteristics described above (e.g., index terms denote regions in key-time space). An index term whose region crosses a split boundary must, like the record versions of data nodes, be present in both pages resulting from the split.

Because index terms denote a range in key space, which differs from data page records which represent points in key space, an index term may need to be in both pages resulting from a key split. This is detected when the index term containing the splitting key for the node and which hence will be the low key bound in the newly created page chains back to an historical index term that is shared with an index term that will remain in the original page because its lower bound key is less than the splitting key.

An important aspect of this situation is that the index term causing the difficulty is an historical index term. Because it points to a page that is part of the historical tree, this page will never be updated and its index term will never need to be updated to accommodate a page split. Hence, any such historical index terms can be copied to both resulting pages without being concerned about any future updating difficulties.

Because index terms denote a range in time space, like data page records, an index term may need to be in both pages resulting from a time split. This happens frequently with historical index terms, and the same technique can be used with them as is used with historical versions (and with index terms whose key range crosses a key-split boundary). That is, the index term is put in both pages resulting from the time-split.

In order to control the version density in each data page a key splitting threshold can be employed. In other words, a data page is typically not key split until records representing the current version reach a utilization threshold. Typically, data pages can split at the current time. This removes from the current page all historical versions, leaving only the last committed version of the data. All current committed versions appear in both the historical page and the current page, since their lifetimes cross the time boundary chosen for splitting the page (e.g. the current time).

The more frequently that a page is time split, the more redundancy is introduced. Thus, for example, if key splitting is delayed excessively, many record versions might appear redundantly in one, two, or more data pages as the results of time splitting.

By setting the key splitting threshold below 100% data pages can be split at an earlier time, the lower the threshold, the fewer redundant record versions. However, as the splitting threshold is reduced, the storage utilization of the current data (also called single version current utilization or SVC) is also reduced commensurately. Accordingly, there can be a tradeoff between how much redundancy is introduced and how large SVC is.

There may be several records on a data page that are being actively updated, and hence have uncommitted versions as their latest versions at the time when a page become full. These uncommitted records do not have lifetimes that cross the time boundary used to split a full page. Nonetheless, they will appear in both resulting pages.

Uncommitted versions must appear in the current page resulting from the time split since this is the page in which their version should live if their transaction commits. They will appear on the historical page for a number reasons that can include the fact that the simple strategy of copying the current page to a newly allocated historical page copies the artifact versions as well; using version compression, these versions, because they are the most recent versions, will be the uncompressed versions from which all earlier versions for their record will be "delta'd". So, without uncompressing the earlier committed version of the record, these uncommitted versions are needed to sustain the compression process. Thus, even though uncommitted data becomes part of an historical page, it will be effectively invisible. It will never be returned as a result of a query.

In order to guarantee that utilization for any version in any page is key-split threshold*ln(2) a time split is typically performed prior to a key split. In this manner the high utilization part of the page utilization lifetime in the time range that ends with the split can be captured. Thereafter, a key split can be performed and the page utilization lifetime started again. If merely a key split were performed, then the high utilization part of the page's lifetime will be missed. Thus, this strategy is important for providing a guarantee as to the average utilization of any version in the database.

Figure 9:
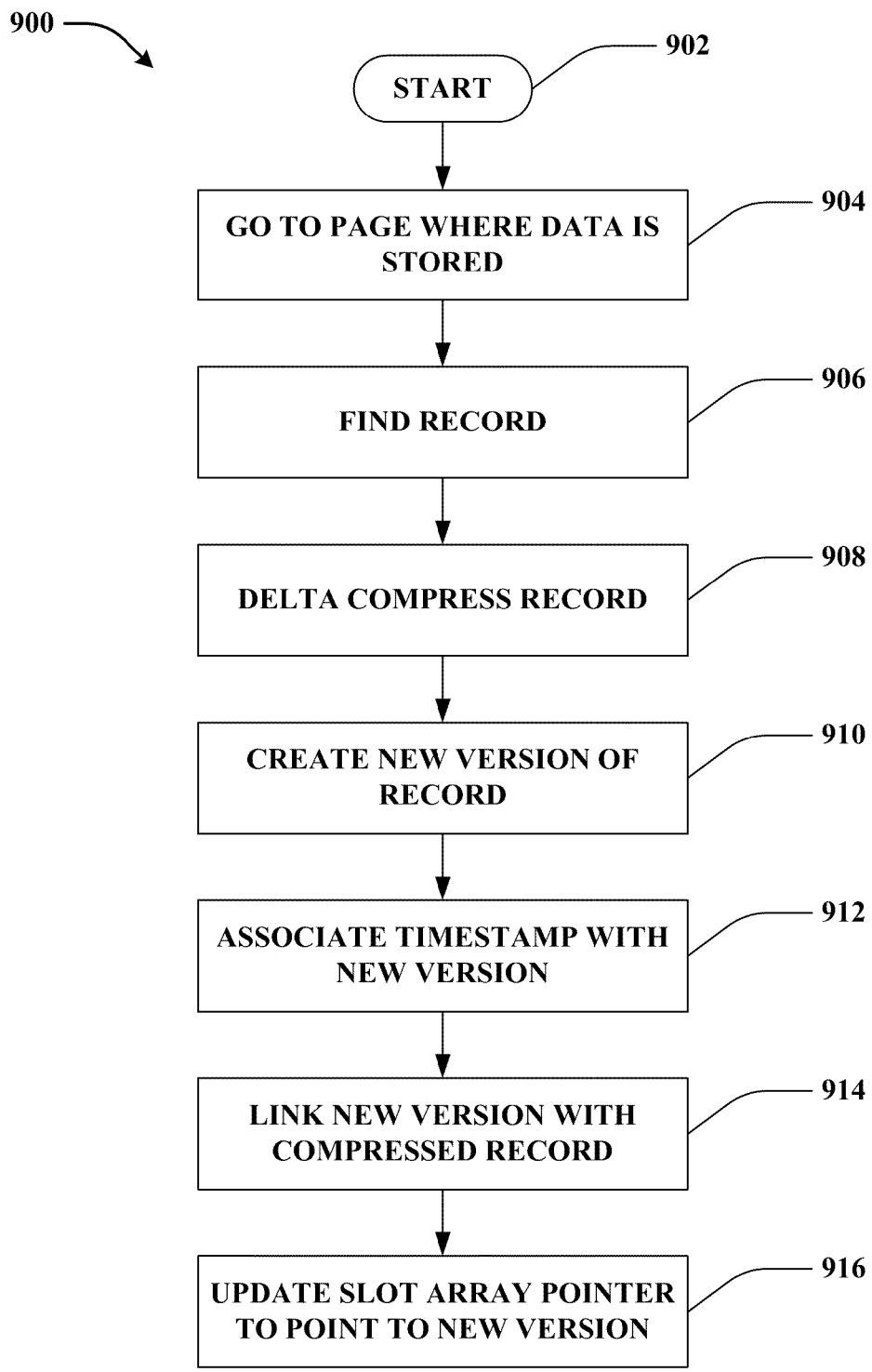
FIG. 9 provides a flow diagram of a method that facilitates and effectuates transaction time indexing with version compression in accordance with the claimed subject matter.

In view of the exemplary systems shown and described supra, methodologies that may be implemented in accordance with the disclosed subject matter will be better appreciated with reference to the flow charts of FIG. 9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 9 provides a flow diagram of a method 900 that facilitates and effectuates transaction time indexing with version compression in accordance with an aspect of the claimed subject matter. Method 900 commences at 902 where general initialization tasks can be performed. At 904 the method locates the page where data is stored. At 906 a record is located and at 908 the record is delta compressed (e.g., the differences between located record and the current version of the record are maintained). It should be noted that a compressed delta record can be an empty delta where an "update" is a delete. At 910 a new version of the record is created. Thereafter at 912 a timestamp is associated with the new version of the record. At 914 the new version of the record and the delta compressed version of the record are linked to form a version chain, and at 916 the slot array pointer associated with the page is updated accordingly to point to the new version of the record (e.g. making the new version of the record the current record).

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
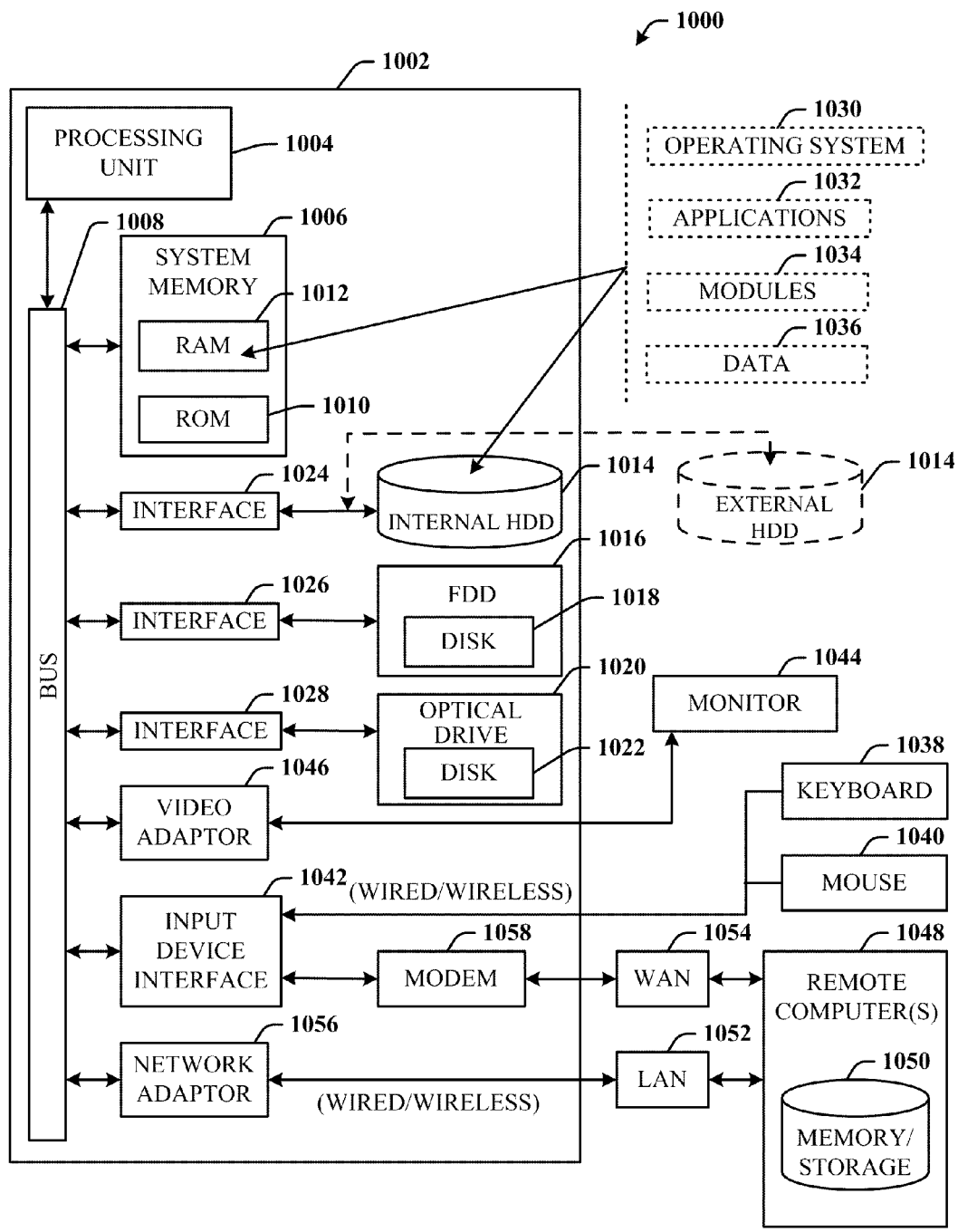
FIG. 10 illustrates a block diagram of a computer operable to execute the disclosed transaction time indexing with version compression architecture.

Referring now to FIG. 10, there is illustrated a block diagram of a computer operable to execute the disclosed transaction time indexing with version compression system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g. a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g. dual band), so the networks can provide real-world performance similar to the basic 10BaseT wired Ethernet networks used in many offices.

Figure 11:
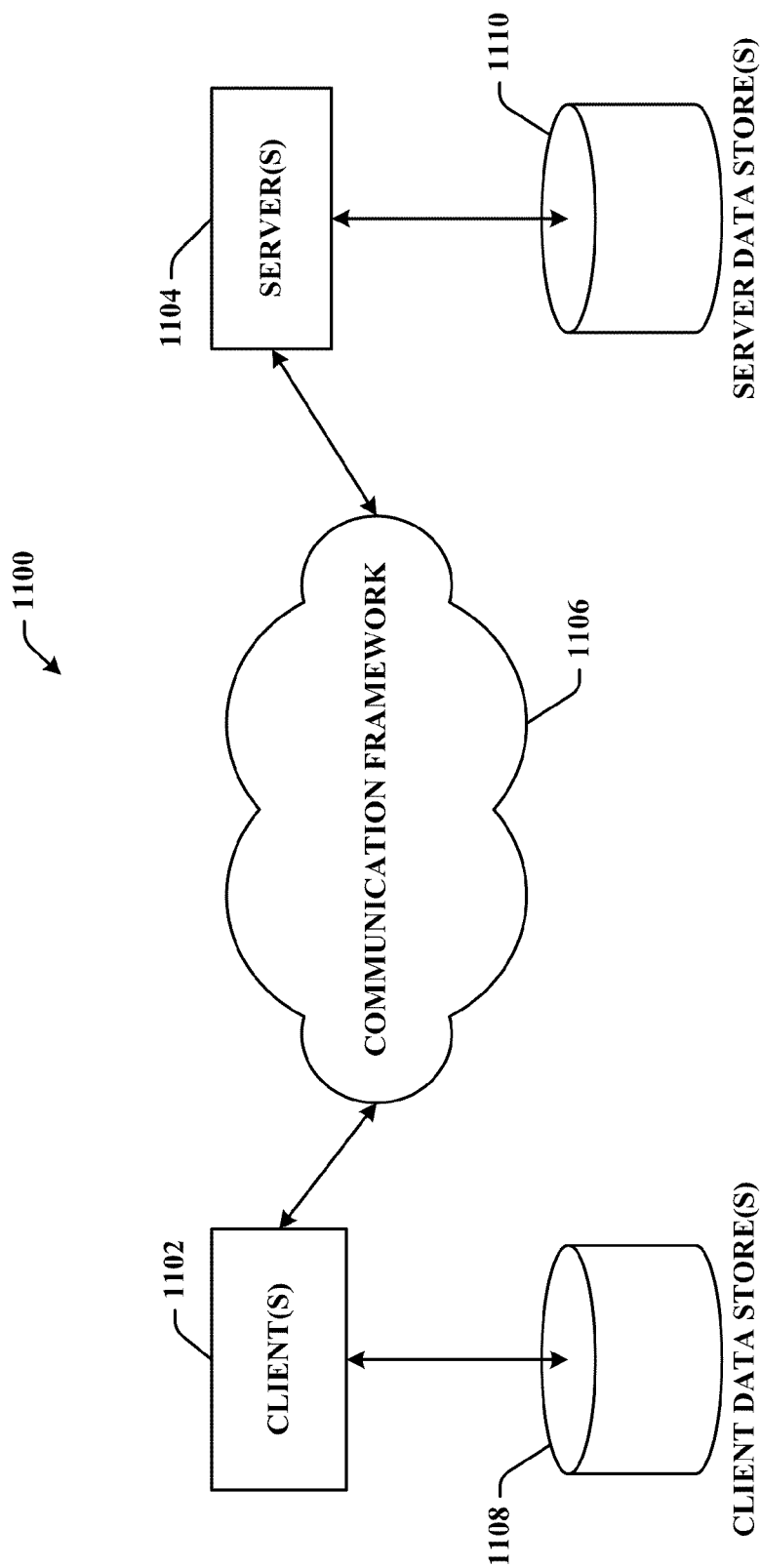
FIG. 11 illustrates a schematic block diagram of an exemplary computing environment for processing the transaction time indexing with version compression architecture in accordance with another aspect.

Referring now to FIG. 11, there is illustrated a schematic block diagram of an exemplary computing environment 1100 for processing the transaction time indexing with version compression architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g. cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that effectuates transaction time indexing with version compression, comprising:
   a processor; and
   a memory component communicatively coupled to the processor, the memory component having stored therein computer-executable instructions configured to implement the system including:
      an indexing component that partitions a database page by performing each of a time partition and a key partition, the key partition performed only upon detecting that a desired storage utilization level for the database page has been exceeded, the time partition performed immediately prior to performing any key partition, wherein the time partition partitions the database page into an historical page and a current page based at least in part on a time or a key;

a compression component that during updates constructs a plurality of backward deltas that illustrate differences between a current version and previous versions of a particular record; and a data page layout including the following:
- a page header including a slot count, an amount of free space, a link to contiguous free space, and timestamp data;
- a used portion containing multiversion data and the plurality of backward deltas;
- a free portion containing the contiguous free space; and
- a dynamic slot array containing a plurality of entries, wherein each entry of the dynamic slot array points to a data record that is a latest version of a record on the database page.

2. The system of claim 1, wherein the indexing component determines whether the database page comprises mainly historical or current records based at least in part on time or key.

3. The system of claim 2, wherein the indexing component performs a time partition on the database page when the database page comprises a desired number of historical records 4. The system of claim 2, wherein the indexing component performs a key partition on the database page when the database page comprises a desired number of current records.

5. The system of claim 1, wherein the indexing component utilizes a partitioning strategy that ensures that the desired storage utilization level for any version on the database page is greater than a minimum value equal to half a storage threshold used to determine when to perform a key partition on the database page.

6. The system of claim 1, wherein the latest version is one that is uncompressed so that decompression is performed based on information from a page on which a record version is located 7. The system of claim 6, wherein the latest version of the record is a last committed version of the record or an uncommitted version from a still executing transaction.

8. The system of claim 1, wherein the index page includes a slotted array that comprises a slot that points to an index term that points to a page containing latest records in a key range.

9. The system of claim 1, wherein the compression component employs a delete stub to indicate a deleted record, the delete stub being associated with a ghost flag.

10. The system of claim 9, wherein the compression component replaces the deleted record with an empty delta compressed record, and further affiliates a timestamp and the ghost flag with the empty delta compressed record.

11. The system of claim 1, wherein the compression component performs decompression by byte replacement based at least in part on information stored in a delta record.

12. The system of claim 1, wherein the compression component removes record versions from the current page that cease to exist across a time split boundary based on a split time and an end time associated with the record versions.

13. A method implemented on a machine for effectuating and facilitating transaction time indexing with version compression, comprising:
employing a processor to execute computer executable instructions stored on a computer readable storage medium to implement the following acts:
utilizing a threshold value to determine when to perform a key partition on a database page, the threshold value indicating a desired storage utilization level for the database page that is increasable without increasing storage allocation necessary to persist all versions of a record;

partitioning the database page by performing a time partition immediately prior to any key partition upon detecting that the threshold has been exceeded, the time partition partitioning the database page into an historical page and a current page based at least in part on a current time;

constructing, by a compression component, a plurality of backward deltas that illustrate differences between a current version and previous versions of a particular record; and employing a data page layout that includes:
- a page header including a slot count, an amount of free space, a link to contiguous free space, and timestamp data;
- a used portion containing multiversion data and the plurality of backward deltas;
- a free portion containing the contiguous free space; and
- a dynamic slot array containing a plurality of entries, wherein each entry of the dynamic slot array points to a data record that is a latest version of a record on the database page.

14. The method of claim 13, wherein the latest version remains uncompressed so that decompression is performed on information from a page from which a record version is located.

15. The method of claim 13, further comprising utilizing a slotted array that includes a slot to point to an index term, the index term points to a page containing one or more latest records in a key range.

16. The method of claim 13, further comprising utilizing a delete stub associated with a ghost flag to indicate a deleted record.

17. The method of claim 13, further comprising performing decompression by byte replacement based on information store in delta records.

18. The method of claim 13, further comprising removing record versions from the current page that cease to exist across a time boundary based on a partition time and an end time associated with record versions.

19. A computer readable storage medium for facilitating and effectuating transaction time indexing with version compression, comprising:
a memory component configured to store computer-readable instructions, the computer-readable instructions including instructions for performing the following acts:
splitting a database page comprising a plurality of temporal based records by performing each of a time partition and a key partition, the key partition performed only upon detecting that a desired storage utilization level for the database page has been exceeded, the time partition performed immediately prior to performing any key partition, wherein the time partition partitions the database page into an artifact page and a current page;

constructing a plurality of backward deltas that reflect updates performed on the database page; and employing a data page layout that includes:
- a page header including a slot count, an amount of free space, a link to contiguous free space, and timestamp data;
- a used portion containing multiversion data and the plurality of backward deltas that illustrate differences between a current version and previous versions of a particular record;
- a free portion containing the contiguous free space; and
- a dynamic slot array containing a plurality of entries, wherein each entry of the dynamic slot array points to a data record that is a latest version of a record on the database page.

* * * * *